J. S. FOLEY & F. W. BAKER.
DETACHABLE OR INTERCHANGEABLE WHEEL FOR MOTOR VEHICLES.
APPLICATION FILED SEPT. 30, 1916.
1,228,310. Patented May 29, 1917.
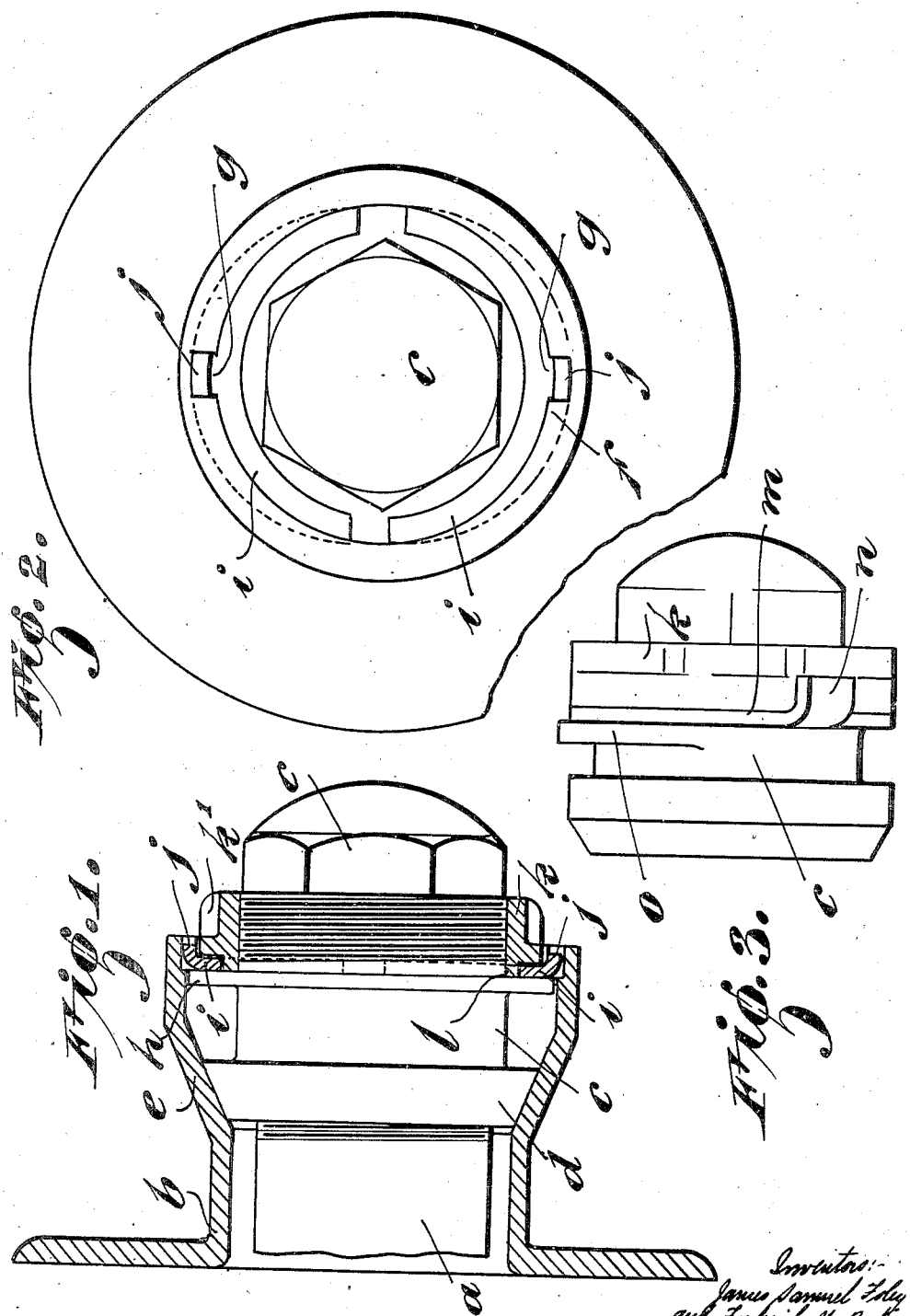

UNITED STATES PATENT OFFICE.

JAMES SAMUEL FOLEY, OF WEST BROMWICH, AND FREDERICK WILLIAM BAKER, OF STOURBRIDGE, ENGLAND.

DETACHABLE OR INTERCHANGEABLE WHEEL FOR MOTOR-VEHICLES.

1,228,310.  Specification of Letters Patent.  Patented May 29, 1917.

Application filed September 30, 1916. Serial No. 123,203.

*To all whom it may concern:*

Be it known that we, JAMES SAMUEL FOLEY, residing at 5 High street, West Bromwich, in the county of Stafford, England, engineer, and FREDERICK WILLIAM BAKER, residing at 59 Hagley road, Stourbridge, in the county of Worcester, England, engineer, subjects of the Kingdom of Great Britain, have invented certain new and useful Improvements in or Relating to Detachable or Interchangeable Wheels for Motor-Vehicles and the like, of which the following is a specification.

This invention relates to detachable or interchangeable wheels for motor vehicles and the like, of the type comprising a permanent or inner hub or member, a detachable hub or member adapted to encircle or be carried by the said permanent or inner hub or member, and a retaining member adapted to be screwed upon the permanent hub or member, and to retain the detachable hub or member in relation thereto.

The present invention has for its purpose to provide a particularly simple and efficient mode of and means for locking the retaining member when in its engaged position.

The present invention has, furthermore, for its purpose to provide for the withdrawal of the detachable hub or member from the permanent hub or member by or through the medium of the retaining member in a particularly satisfactory manner.

The retaining member is screwed upon the permanent hub or member, and in the present invention the screwed connection may be the same hand, in the case of all the wheels of the vehicle. The locking member according to the present invention, operates by virtue of a screw, and this also may be of the same hand in connection with all of the wheels of the vehicle, so that any detachable hub or wheel pertaining to the vehicle may be assembled in relation to any permanent hub of the vehicle in the same manner, and by the same operation.

According to the present invention, the retaining member takes the form of a cap or ring adapted to be screwed upon the outer extremity of the permanent hub, and to engage with the detachable hub in a manner whereby when the retaining member is screwed up, the detachable hub or member is appropriately retained in relation to the permanent hub or member.

A locking ring or member for locking the retaining member is screwed upon the latter, and is adapted to engage with the detachable hub or member, advantageously indirectly, through the medium of an intermediate member or members. This intermediate member, or these intermediate members, may be conveniently in the nature of a washer or of sections of a washer adapted to have such a connection with the detachable hub or member that it or they cannot rotate in relation to the latter, and said intermediate members are adapted to be gripped between the locking member and a shoulder or enlargement provided upon the retaining member.

After the retaining member has been screwed up, the locking member therefore is screwed up, and thus the intermediate member or members which are coupled to the detachable hub or member are gripped between the locking member and the shoulder upon the retaining member. The usual drive members are provided upon the permanent and detachable hub members so that the detachable hub cannot rotate in relation to the permanent hub. Should the retaining member tend to unscrew, the locking member carried thereby, being in frictional contact with the intermediate member which is retained from rotation by its positive connection with the detachable hub, thereby tends or has a tendency to screw up and thus accidental detachment of the retaining member is avoided.

In order that this invention may be clearly understood and readily carried into practice, reference may be had to the appended explanatory sheet of drawings, upon which:—

Figure 1 is a part-sectional elevation of a main and detachable hub combination according to the present invention.

Fig. 2 is an end elevation of the part shown in Fig. 1, the ring being removed for purposes of illustration.

Fig. 3 illustrates a modified form of the invention.

In a convenient embodiment of the present invention, and referring to Figs. 1 and 2 of the drawings, we employ a permanent hub member $a$ having near its inner extremity (not shown) a cone formation, and having in its central part a drive formation (not shown), adapted to engage with a similar drive formation in the central part of the detachable hub $b$ which latter may be furnished with a female cone formation adapted to engage with the male cone formation occurring near the inner extremity of the permanent hub.

The retaining member is in the form of a cap $c$ adapted to be screwed upon the outer extremity of the permanent hub $a$, and said cap $c$ has at its inner extremity a male cone $d$ adapted to engage with a second female cone opposed to the first-mentioned female cone, within the detachable hub $b$.

The retaining member is of form permitting of its inner part being passed into the outer end of the detachable hub $b$, and the latter at its outer end is furnished with an inturned flange $f$, which latter is slotted, recessed, or perforated conveniently at two points in its diameter, as at $g, g$. At a point or plane within the outer extremity of the detachable hub, the retaining member $c$ is furnished with an annular shoulder $h$ of diameter suited to permit of its passing within the inturned flange $f$ at the outer extremity of the detachable hub $b$. Against this shoulder two substantially semi-circular ring portions, $i, i$ are assembled, each having a lug $j$, projection, rivet, or the equivalent, adapted to take into one of the slots, holes, or recesses $g$ in the inward flange $f$ at the outer extremity of the detachable hub $b$. The lugs $j$ are disposed within the outer contours of the semi-circular members $i$ and said semi-circular members after being introduced, are of a character whereby they may be displaced radially outward to engage with the inner side of the inturned flange $f$ of the detachable hub, and thereby provide for the withdrawal of the latter.

The locking member adapted to be screwed upon the retaining member is in the form of a ring $k$, and is furnished at its inner extremity with a part $l$ adapted to engage with the inner surface of the semi-circular members $i$, so that when the locking member $k$ is assembled, the semi-circular members $i$ are retained in their outermost positions in which they engage with the inner surface of the inturned flange $f$ upon the detachable hub $b$. The locking member $k$ is of a character whereby it is adapted to grip the members $i, i$ between itself and the enlargement $h$ upon the retaining member $c$, and the semi-circular members $i$ being incapable of rotation in relation to the detachable member $b$, thus serve to provide for the locking of the retaining member $c$ or for preventing of accidental detachment of the latter.

If desired, the part $l$ of the member $k$ may be furnished with a male cone formation, adapted, when the member $k$ is assembled, to force the semi-circular members $i$ outwardly, thereby expanding them into positions in which they engage with the inner surface of the inturned flange $f$ upon the detachable hub.

Projections $k^1$ may be provided at intervals around the member $k$, and may constitute the means by which the latter is rotated. A double-ended spanner may be provided, one end of which is adapted to provide for the release of the member $k$, and after the member $k$ has been loosened, as, for instance, by one complete turn, the other end of the spanner is applied to the member $c$. It is desirable when unscrewing the member $c$, to also unscrew the member $k$, and for this purpose the part of the spanner adapted to engage with the member $c$ may be furnished with one or more lugs or projections adapted to engage with the projections $k^1$ upon the member $k$ so that both of the members $c$ and $k$ may be thereby unscrewed collectively.

Any convenient means (not shown) may be incorporated for limiting the extent to which the locking member may be unscrewed in relation to the retaining member, so that normally the locking member, retaining member, semi-circular members and detachable hub are combined, and are adapted to be withdrawn from the permanent hub as a combined whole.

In a modified embodiment of the present invention, shown in Fig. 3, instead of the two semi-circular members, we employ a unitary ring $m$ furnished with two lugs $n$, which in this case are disposed outside of the outer circle or contour of the ring $m$, said lugs $n$ being adapted to engage with the slots $g$ in the inturned flange $f$ of the detachable hub $b$.

Said ring $m$ is of diameter permitting of its being passed through the flanged outer extremity of the detachable hub $b$ into engagement with the enlargement $o$ upon the retaining member, but in order, in this case, to provide for the withdrawal of the detachable hub by the retaining member, the enlargement $o$ last mentioned is of diameter exceeding the internal diameter of the outer flanged end of the detachable hub, and in order to permit of the passage of the enlargement $o$ into the detachable hub, such enlargement $o$ is provided around only a part of the circumference, so that it can be assembled by bringing the parts into eccentric relationship, and upon the parts being subsequently centralized, the ring inserted, and the locking member assembled, the parts are retained in their concentric positions.

By this last described arrangement it will be noted that we provide for the withdrawal of the detachable hub by the retaining member, and also provide that such retaining member is separable from the detachable hub after the latter has been withdrawn. The retaining cap or member can thus be readily used with another shell on the same permanent hub.

If desired the screw thread between the locking member $k$ and the retaining member $c$ may be "quicker" or "slower" than the thread between the retaining member $c$ and the permanent hub.

What we claim as our invention and desire to secure by Letters Patent is:—

1. A permanent and detachable hub combination, having a retaining member having a screwed connection with the permanent hub and adapted to engage with the detachable hub, and a locking member having a screwed connection with the retaining member, the locking of the retaining member being effected by engagement of the locking member with a part which is restrained from rotation in relation to the hub.

2. A detachable and permanent hub combination, having a screwed retaining member and a locking member screwed thereon, such locking member being adapted to engage with a member extending circumferentially of the hub, which member is relatively restrained from rotation in relation to, but is axially movable in relation to, the detachable hub.

3. A detachable and permanent hub combination having a screwed retaining member and a locking member screwed thereon, and substantially semi-circular members intermediate said retaining member and said locking member, said substantially semi-circular members engaging with the detachable hub to prevent the rotation of the semi-circular members relatively thereto.

4. A detachable and permanent hub combination having a screwed retaining member, a locking member having screwed connection with said retaining member, and a member extending circumferentially of the hub intermediate said retaining member and said locking member with which intermediate member said retaining and locking members have frictional engagement, said intermediate member being retained from rotation in relation to the detachable hub, but being separable therefrom.

5. A permanent and detachable hub combination having a screwed retaining member adapted to engage with the detachable hub, a part restrained from rotation in relation to the hub by engagement with the detachable hub but which is axially movable with relation to the hub, and a screwed locking member for said retaining member, said retaining and locking members being prevented from becoming detached by reason of frictional engagement between said members and said restrained part.

In witness whereof we have hereunto set our hands in the presence of two witnesses.

JAMES SAMUEL FOLEY.
FREDERICK WILLIAM BAKER.

Witnesses:
 ARTHUR HENRY BROWN,
 HOLLIS BROWN.